(12) United States Patent
Rodwell et al.

(10) Patent No.: US 11,614,069 B2
(45) Date of Patent: Mar. 28, 2023

(54) JOINTED ROTOR BLADE HAVING A CHORD-WISE EXTENDING PIN SUPPORTED VIA ONE OR MORE STRUCTURAL MEMBERS

(71) Applicant: General Electric Company, Schenectady, NY (US)

(72) Inventors: Andrew Mitchell Rodwell, Greenville, SC (US); Thomas Merzhaeuser, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/413,124

(22) PCT Filed: Dec. 13, 2018

(86) PCT No.: PCT/US2018/065322
§ 371 (c)(1),
(2) Date: Jun. 11, 2021

(87) PCT Pub. No.: WO2020/122909
PCT Pub. Date: Jun. 18, 2020

(65) Prior Publication Data
US 2022/0065219 A1 Mar. 3, 2022

(51) Int. Cl.
*F03D 1/06* (2006.01)
(52) U.S. Cl.
CPC ...... *F03D 1/0675* (2013.01); *F05B 2230/604* (2013.01); *F05B 2240/302* (2013.01)
(58) Field of Classification Search
CPC .. F03D 1/0675; F03D 1/0685; F05B 2230/60; F05B 2240/302
See application file for complete search history.

(56) References Cited

U.S. PATENT DOCUMENTS 851,196 A 4/1907 Bevans et al.
4,474,536 A 10/1984 Gougeon et al.
(Continued)

FOREIGN PATENT DOCUMENTS

EP 2186622 A1 5/2010
EP 3144526 A1 3/2017
(Continued)

OTHER PUBLICATIONS

International Search Report and Opinion Corresponding to PCT/US2018/065322 dated Aug. 14, 2019.

*Primary Examiner* — Justin D Seabe
*Assistant Examiner* — Sang K Kim
(74) *Attorney, Agent, or Firm* — Dority & Manning, P.A.

(57) ABSTRACT

A rotor blade for a wind turbine includes first and second blade segments extending in opposite directions from a chord-wise joint. Each of the first and second blade segments includes at least one shell member defining an airfoil surface and an internal support structure. The internal support structure of the first blade segment includes a beam structure extending lengthwise, whereas the internal support structure of the second blade segment includes a receiving section that receives the beam structure of the first blade segment. Further, the rotor blade includes at least one chord-wise extending pin positioned through the beam structure and the receiving section at the chord-wise joint so as to secure the first and second blade segments together. The rotor blade includes at least one additional support member that receives a portion of the chord-wise extending pin so as to reduce a chord-wise bending deflection of the chord-wise extending pin at the chord-wise joint.

12 Claims, 7 Drawing Sheets

(56) References Cited

U.S. PATENT DOCUMENTS

| | | |
|---|---|---|
| 4,643,646 A | 2/1987 | Hahn et al. |
| 4,732,542 A | 3/1988 | Hahn et al. |
| 5,281,454 A | 1/1994 | Hanson |
| 6,843,953 B2 | 1/2005 | Filsinger et al. |
| 7,334,989 B2 | 2/2008 | Arelt |
| 7,344,360 B2 | 3/2008 | Wetzel |
| 7,901,188 B2 | 3/2011 | Llorente Gonzalez et al. |
| 7,922,454 B1 | 4/2011 | Riddell |
| 7,927,077 B2 | 4/2011 | Olson |
| 7,997,874 B2 | 8/2011 | van der Bos |
| 7,998,303 B2 | 8/2011 | Baehmann et al. |
| 8,123,488 B2 | 2/2012 | Finnigan et al. |
| 8,297,932 B2 | 10/2012 | Arocena De La Rua et al. |
| 8,348,622 B2 | 1/2013 | Bech |
| 8,356,982 B2 | 1/2013 | Petri Larrea et al. |
| 8,376,713 B2 | 2/2013 | Kawasetsu et al. |
| 8,388,316 B2 | 3/2013 | Arocena De La Rua et al. |
| 8,517,689 B2 | 8/2013 | Kyriakides et al. |
| 8,919,754 B2 | 12/2014 | Schibsbye |
| 9,669,589 B2 | 6/2017 | Zamora Rodriguez et al. |
| 9,790,919 B2 * | 10/2017 | Leonard ............... F03D 1/0675 |
| 10,801,469 B2 * | 10/2020 | Hancock ............... F03D 1/0633 |
| 11,353,002 B2 * | 6/2022 | Meeks ................. F16C 33/201 |
| 2007/0018049 A1 | 1/2007 | Stuhr |
| 2007/0253824 A1 | 11/2007 | Eyb |
| 2009/0116962 A1 | 5/2009 | Pedersen et al. |
| 2009/0155084 A1 | 6/2009 | Livingston et al. |
| 2009/0162208 A1 | 6/2009 | Zirin et al. |
| 2010/0132884 A1 | 6/2010 | Baehmann et al. |
| 2010/0215494 A1 | 8/2010 | Bech et al. |
| 2010/0304170 A1 | 12/2010 | Frederiksen |
| 2011/0052403 A1 | 3/2011 | Kawasetsu et al. |
| 2011/0081247 A1 | 4/2011 | Hibbard |
| 2011/0081248 A1 | 4/2011 | Hibbard |
| 2011/0091326 A1 | 4/2011 | Hancock |
| 2011/0158788 A1* | 6/2011 | Bech ................. F03D 1/0683 29/889.7 |
| 2011/0158806 A1 | 6/2011 | Arms et al. |
| 2011/0229336 A1 | 9/2011 | Richter et al. |
| 2012/0093627 A1 | 4/2012 | Christenson et al. |
| 2012/0196079 A1 | 8/2012 | Brauers et al. |
| 2012/0213642 A1 | 8/2012 | Wang et al. |
| 2012/0269643 A1 | 10/2012 | Hibbard et al. |
| 2012/0308396 A1 | 12/2012 | Hibbard |
| 2013/0040151 A1 | 2/2013 | Jeromerajan et al. |
| 2013/0064663 A1 | 3/2013 | Loth et al. |
| 2013/0129518 A1 | 5/2013 | Hayden et al. |
| 2013/0164133 A1 | 7/2013 | Grove-Nielsen |
| 2013/0177433 A1 | 7/2013 | Fritz et al. |
| 2013/0189112 A1 | 7/2013 | Hedges et al. |
| 2013/0189114 A1 | 7/2013 | Jenzewski et al. |
| 2013/0219718 A1 | 8/2013 | Busbey et al. |
| 2013/0224032 A1 | 8/2013 | Busbey et al. |
| 2013/0236307 A1 | 9/2013 | Stege |
| 2013/0236321 A1 | 9/2013 | Olthoff |
| 2014/0286780 A1 | 9/2014 | Lemos et al. |
| 2015/0204200 A1 | 7/2015 | Eyb et al. |
| 2015/0369211 A1 | 12/2015 | Merzhaeuser |
| 2018/0274521 A1 | 9/2018 | Akhtar et al. |
| 2018/0340510 A1 | 11/2018 | Huth et al. |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

* cited by examiner

JOINTED ROTOR BLADE HAVING A CHORD-WISE EXTENDING PIN SUPPORTED VIA ONE OR MORE STRUCTURAL MEMBERS

FIELD

The present disclosure relates generally to wind turbines, and more particularly to a jointed wind turbine rotor blade having a chord-wise extending pin supported via one or more structural members.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

As wind turbines continue to increase in size, the rotor blades also increase in size. Thus, larger rotor blades may be constructed in segments that can be assembled on site via one or more pin joints. For example, certain jointed rotor blades may include a first blade segment having a beam structure that is received within a receiving section of a second blade segment that is further secured together via one or more span-wise and/or chord-wise extending pins that transfer the blade bending moment from one segment to the other. Thus, the pin joints are configured to allow the blade tip to flex to withstand some of this load.

The bending moment, however, results in pin deflection at the ends thereof and an opposite deflection at the center. This deflection causes problems in the pin joint supports due to the rotational deflection that induces bending stresses in the supports and peaking of crush stresses in the supports and any bushings that may be used.

Thus, the present disclosure is directed to an improved wind turbine jointed rotor blade having at least one chord-wise extending pin supported via one or more structural members that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface and an internal support structure. The internal support structure of the first blade segment includes a beam structure extending lengthwise, whereas the internal support structure of the second blade segment includes a receiving section that receives the beam structure of the first blade segment. Further, the rotor blade includes at least one chord-wise extending pin positioned through the beam structure and the receiving section at the chord-wise joint so as to secure the first and second blade segments together. Moreover, the rotor blade includes at least one additional support member that receives at least a portion of the chord-wise extending pin so as to reduce a chord-wise bending deflection of the chord-wise extending pin at the chord-wise joint.

In one embodiment, the beam structure of the first blade segment may be hollow. In another embodiment, the additional support member(s) may include at least one web member. In such embodiments, the chord-wise extending pin(s) may extend through the web member(s). In additional embodiments, the web member(s) may be arranged within the hollow beam structure. In further embodiments, the web member(s) may be integral with the beam structure.

In several embodiments, the chord-wise extending pin(s) may include a first chord-wise extending pin and a second chord-wise extending pin. In such embodiments, the first chord-wise extending pin and the second chord-wise extending pin may be arranged in an end-to-end configuration. In further embodiments, ends of the first chord-wise extending pin and the second chord-wise extending pin may abut against each other within the web member(s).

In particular embodiments, the web member(s) may include a first web member and a second web member. In such embodiments, ends of the first chord-wise extending pin and the second chord-wise extending pin may abut against each other between the first and second web members.

In additional embodiments, the first chord-wise extending pin and the second chord-wise extending pin may be spaced apart. In such embodiments, the first chord-wise extending pin may extend through a first side of the beam structure and the second chord-wise extending pin may extend through an opposing, second side of the beam structure, with the first and second web members arranged outside of the hollow beam structure.

In further embodiments, the additional support member may be at least one tube positioned within the hollow beam structure. In such embodiments, the chord-wise extending pin may extend through the tube(s). In alternative embodiments, the additional support member(s) may be at least one filler material that fills the hollow beam structure. In such embodiments, the chord-wise extending pin may extend through the filler material(s).

In another aspect, the present disclosure is directed to a method of securing blade segments of a rotor blade of a wind turbine together. The method includes providing a first blade segment having a beam structure that extends lengthwise in a generally span-wise direction. The method also includes providing a second blade segment having a receiving section that extends lengthwise in the generally span-wise direction. Further, the method includes inserting the beam structure of the first blade segment into the receiving section of the second blade segment such that the first and second blade segments extend in opposite directions from a chord-wise joint. As such, the method includes inserting at least one chord-wise extending pin through the beam structure and the receiving section at the chord-wise joint so as to join the first and second blade segments together and through at least one additional support member so as to reduce a chord-wise bending deflection of the chord-wise extending pin at the chord-wise joint.

In one embodiment, the method may include forming the beam structure of the first blade segment such that the additional support member(s) is integral therewith. In another embodiment, the additional support member(s) may include one or more web members, one or more tubes, and/or a filler material.

In further embodiments, the method may include arranging the additional support member(s) within the beam structure. Alternatively, the method may include arranging the additional support member(s) outside of the beam structure. It should be further understood that the method may include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
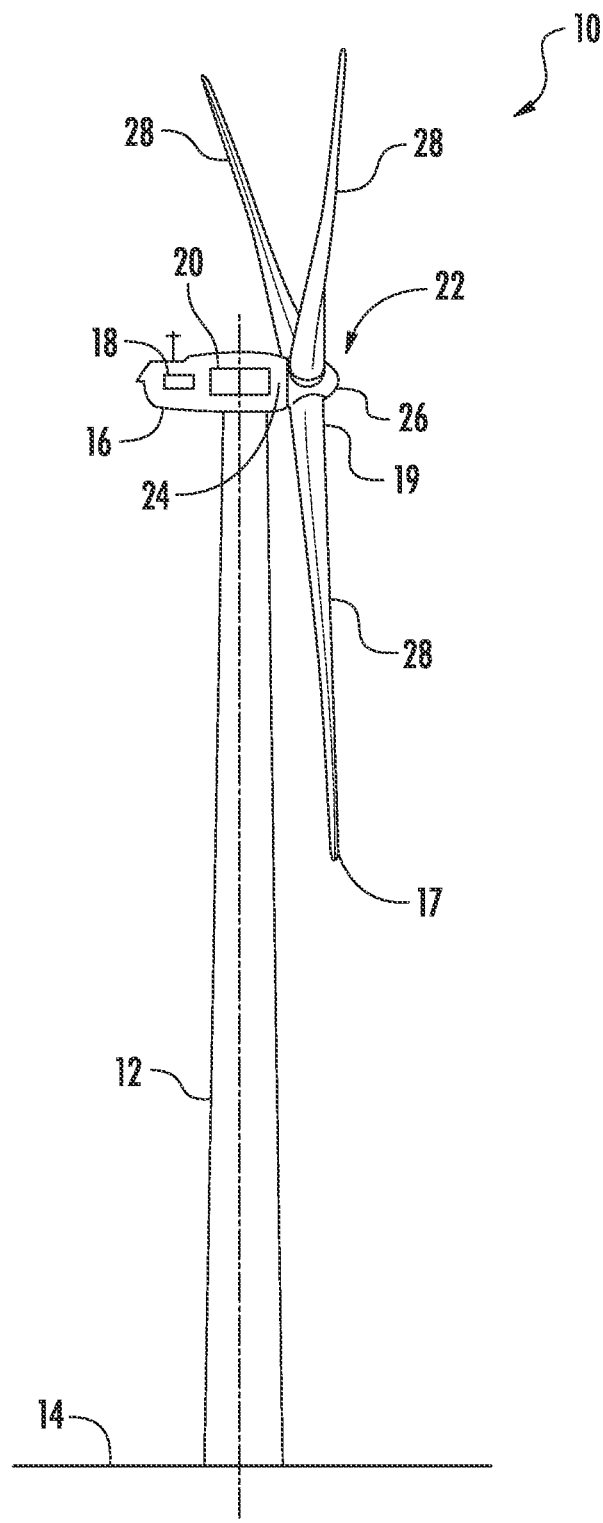
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
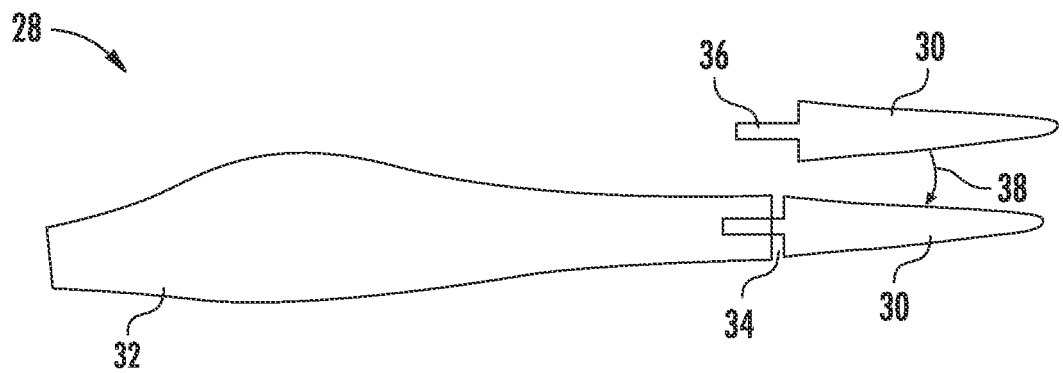
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include a pressure side shell member and a suction side shell member. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with a blade root section 35 of the rotor blade 28 (which is shown in more detail in FIG. 7) and with the beam structure 40 of the first blade segment 30 (which is shown in more detail in FIG. 5).

Figure 3:
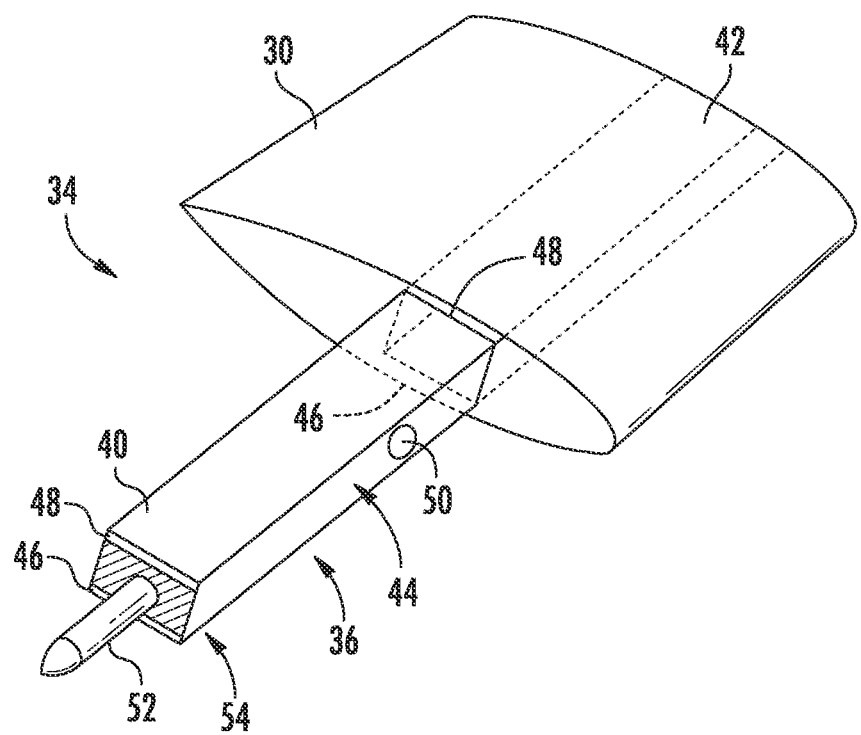
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Moreover, as shown, the first blade segment 30 may include one or more first pin joints at a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 at the chord-wise joint 34. Moreover, as shown, the pin joint slot 50 may be oriented in a chord-wise direction.

Figure 4:
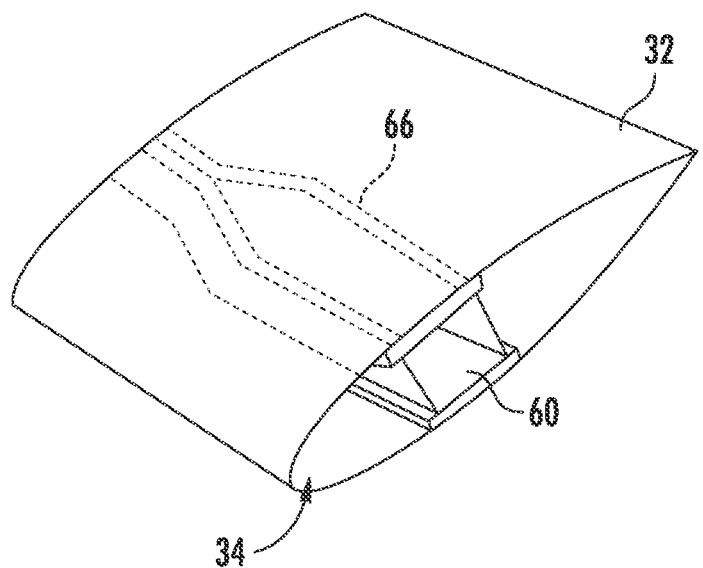
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include the spar structures 66 that extend lengthwise for connecting with the beam structure 40 of the first blade segment 30.

Figure 5:
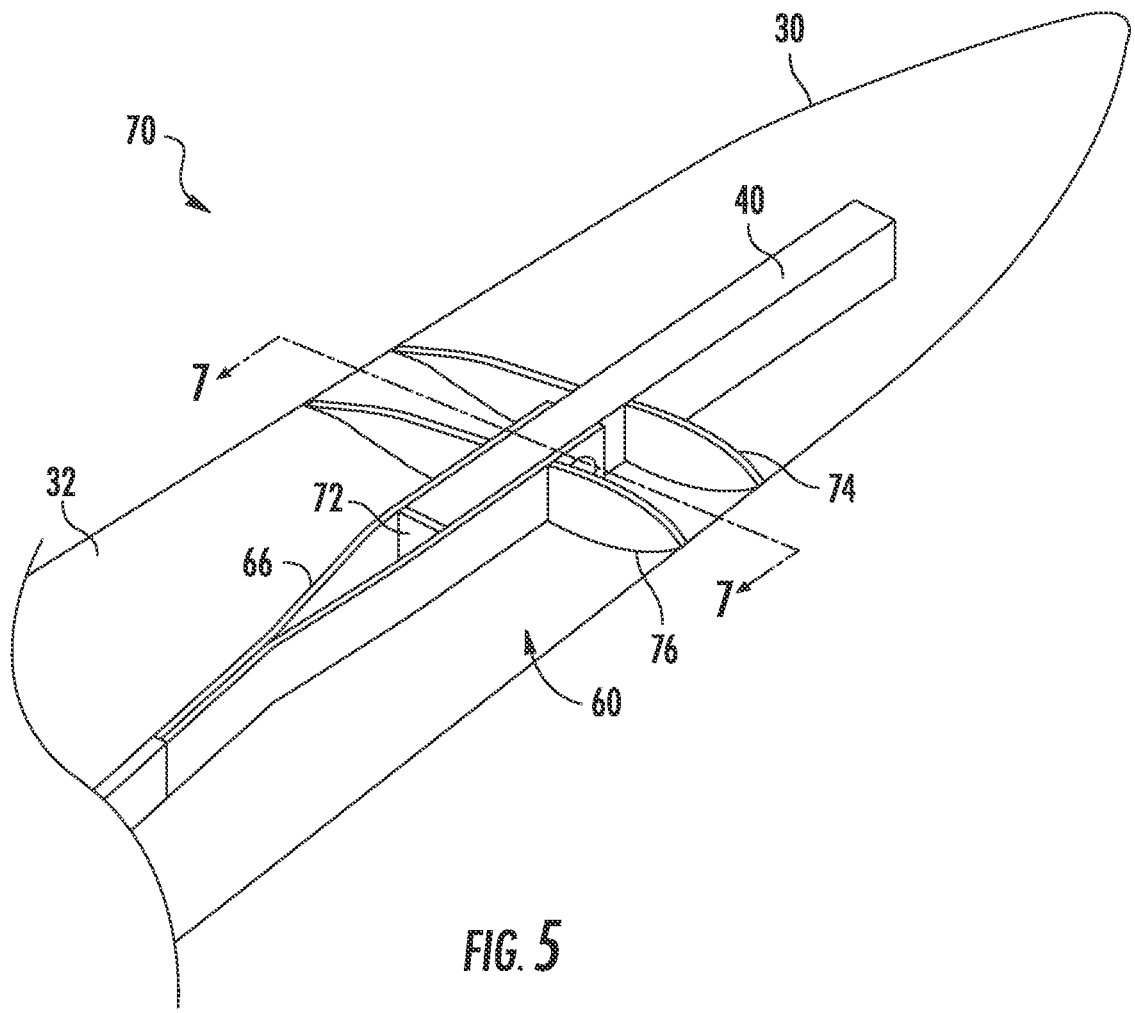
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. In another embodiment, each of the spar structures 66, the rectangular fastening element 72, and the chord-wise members 74, 76 may be constructed of glass reinforced fibers.

Figure 6:
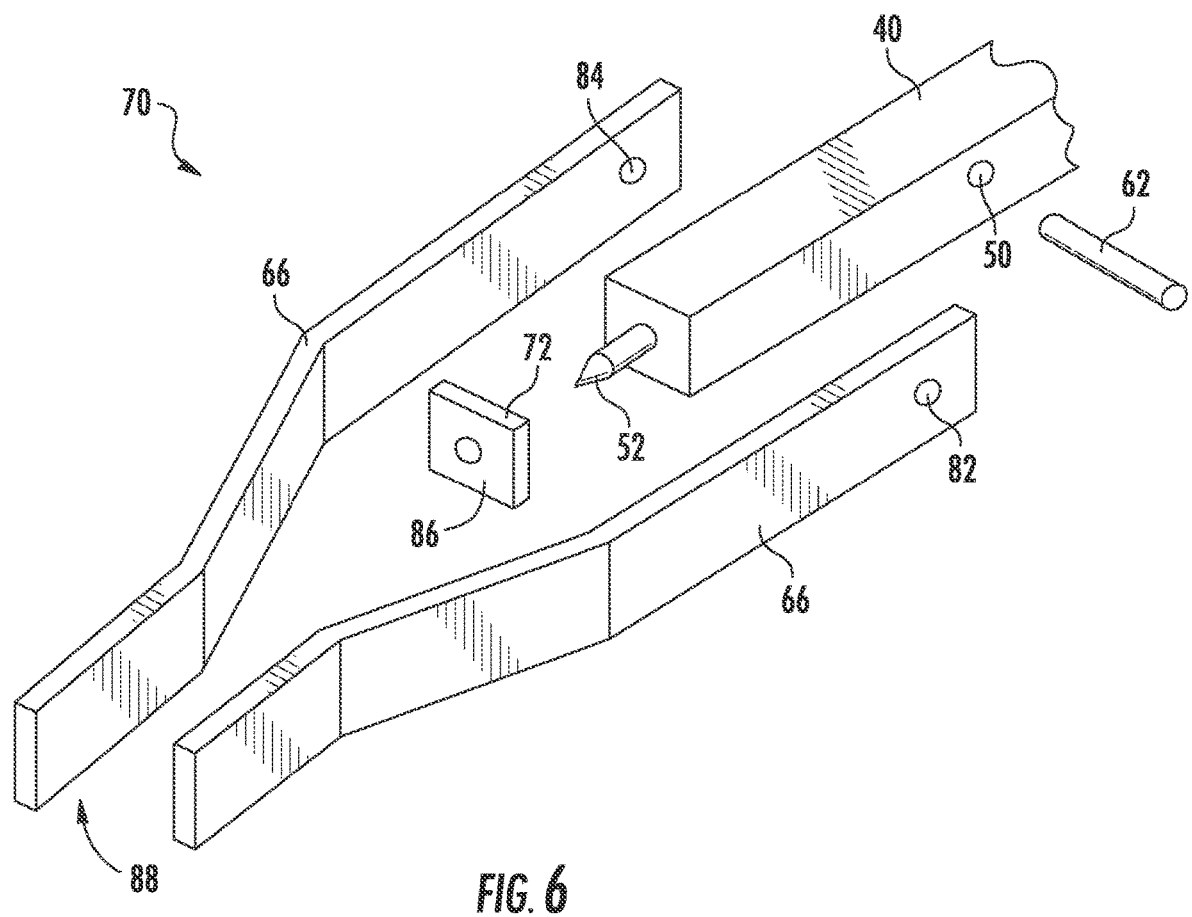
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, the pair of spar structures 66 is configured to receive the beam structure 40 and may include pin joint slots 82, 84 that are aligned with the pin joint slot 50 of the beam structure 40 through which a chord-wise extending 62 may be inserted. Further, as shown, the chord-wise extending 62 may be configured to remain in a tight interference fit within the aligning pin joint slots 82, 50, 84 such that spar structures 66 and the beam structure 40 are joined together during assembly. Further, FIG. 6 also illustrates the rectangular fastening element 72 that includes a pin joint slot 86 configured for receiving the pin tube 52 of the beam structure 40. As such, the pin tube 52 is configured to form a tight interference fit pined joint. Further, the pair of spar structures 66 may be joined together at one end 88 using any suitable adhesive material or an elastomeric seal.

Figure 7:
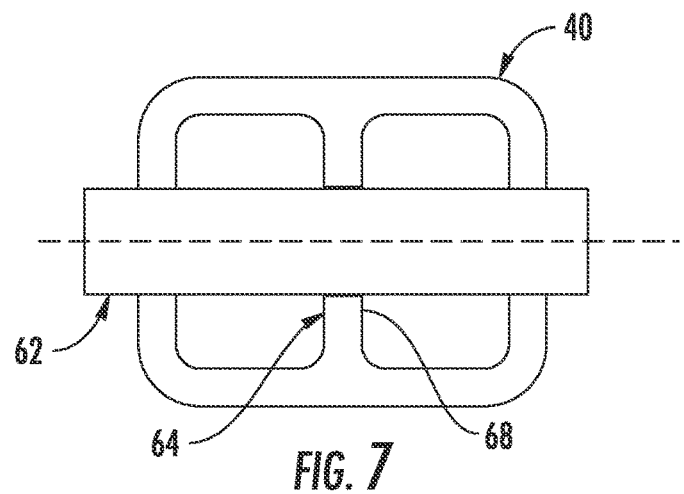
FIG. 7 illustrates a cross-sectional view of the chord-wise joint of FIG. 5 along section line 7-7, particularly illustrating a chord-wise extending pin extending through an additional web member.

Referring to FIGS. 7-12, various cross-sectional views of the chord-wise joint 34 according to the present disclosure are illustrated. More particularly, FIG. 7 illustrates a cross-sectional view of the chord-wise joint 34 of FIG. 5 along section line 7-7 is illustrated. Thus, as shown, the chord-wise extending pin 62 is positioned through the chord-wise joint 34 so as to secure the internal support structures (i.e. the beam structure 40 and the receiving section 60) of the first and second blade segments 30, 32 together. Further, as shown generally in FIGS. 7-12, the rotor blade 28 includes at least one additional support member 64 that receives at least a portion of the chord-wise extending pin 62 so as to reduce a chord-wise bending deflection of the chord-wise extending pin at the chord-wise joint 34.

Figure 8:
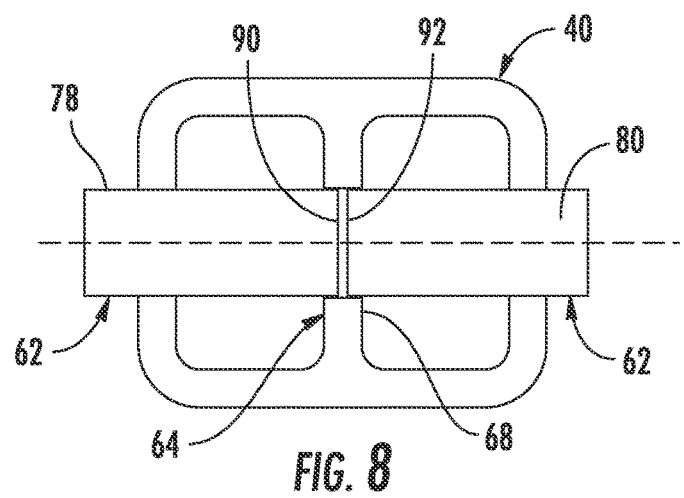
FIG. 8 illustrates a cross-sectional view of another embodiment of the chord-wise joint according to the present disclosure, particularly illustrating first and second chord-wise extending pins extending through an additional web member.
Figure 9:
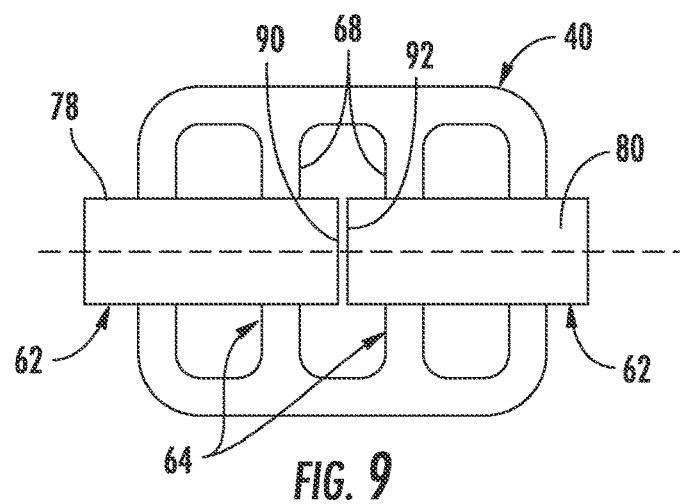
FIG. 9 illustrates a cross-sectional view of yet another embodiment of the chord-wise joint according to the present disclosure, particularly illustrating first and second chord-wise extending pins extending through two additional web members within the beam structure of the first blade segment.
Figure 10:
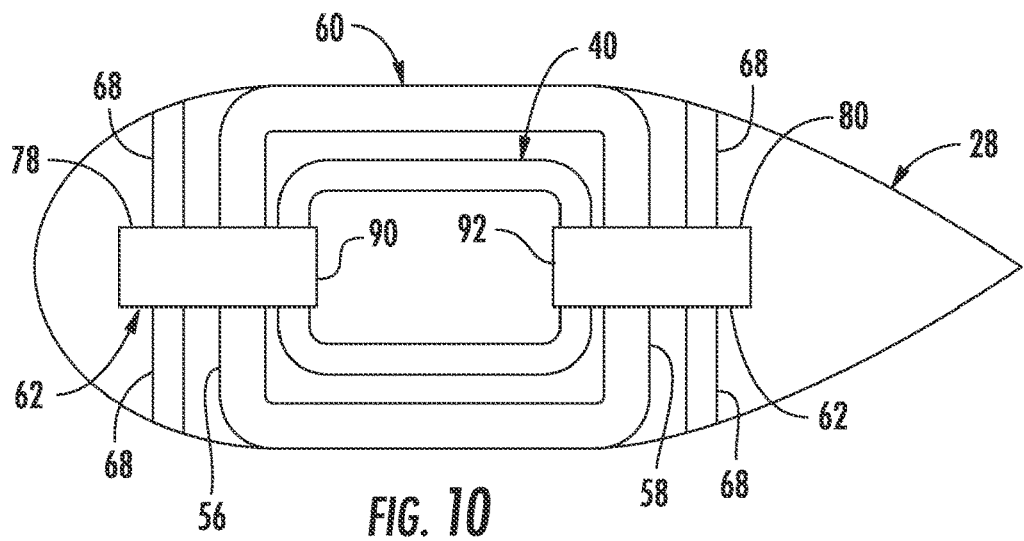
FIG. 10 illustrates a cross-sectional view of still another embodiment of the chord-wise joint according to the present disclosure, particularly illustrating first and second chord-wise extending pins extending through two web members outside of the beam structure of the first blade segment.

More particularly, as shown, the beam structure 40 of the first blade segment 30 may be hollow. Thus, as shown in FIGS. 7-10, the additional support member(s) 64 may be a web member 68. In such embodiments, the chord-wise extending pin(s) may extend through the web member(s). In addition, as shown in FIGS. 7-9, the web member(s) 68 may be arranged within the hollow beam structure 40. In such embodiments, as shown, the web member(s) 68 may be integral with the beam structure 40. Alternatively, as shown in FIG. 10, the web member(s) 68 may be arranged outside of the beam structure 40. Thus, in such embodiments, the web member(s) 68 may be separate from the beam structure 40.

In several embodiments, as shown particularly in FIGS. 8 and 9, the chord-wise extending pin(s) 62 may include a first chord-wise extending pin 78 and a second chord-wise extending pin 80. In such embodiments, as shown, the first chord-wise extending pin 78 and the second chord-wise extending pin 80 may be arranged in an end-to-end configuration. In further embodiments, as shown in FIG. 8, ends 90, 92 of the first chord-wise extending pin 78 and the second chord-wise extending pin 80 may abut against each other within the web member(s) 68.

In alternative embodiments, as shown in FIG. 9, the web member(s) 68 may include a first web member 94 and a second web member 96. In such embodiments, as shown in FIG. 9, the ends 90, 92 of the first chord-wise extending pin 78 and the second chord-wise extending pin 80 may abut against each other between the first and second web members 94, 96.

Referring now to FIG. 10, the first chord-wise extending pin 78 and the second chord-wise extending pin 80 may be spaced apart from each other. In such embodiments, as shown, the first chord-wise extending pin 78 may extend through a first side 56 of the beam structure 40, whereas the second chord-wise extending pin 80 may extend through an opposing, second side 58 of the beam structure 40. In addition, as shown, the web members 68 may be arranged outside of the beam structure 40.

Figure 11:
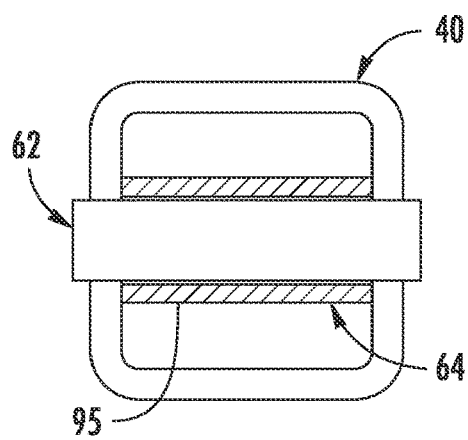
FIG. 11 illustrates a cross-sectional view of another embodiment of the chord-wise joint according to the present disclosure, particularly illustrating a chord-wise extending pin extending through a tube at the chord-wise joint.
Figure 12:
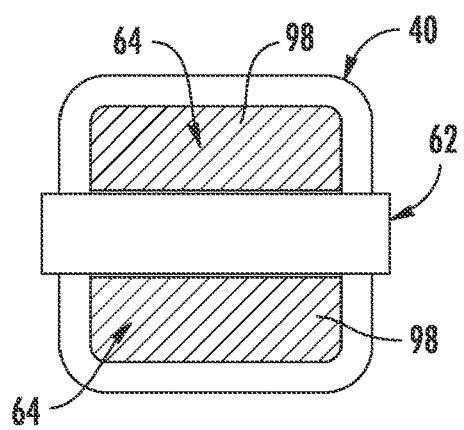
FIG. 12 illustrates a cross-sectional view of yet another embodiment of the chord-wise joint according to the present disclosure, particularly illustrating a chord-wise extending pin extending through a filler material at the chord-wise joint.
Figure 13:
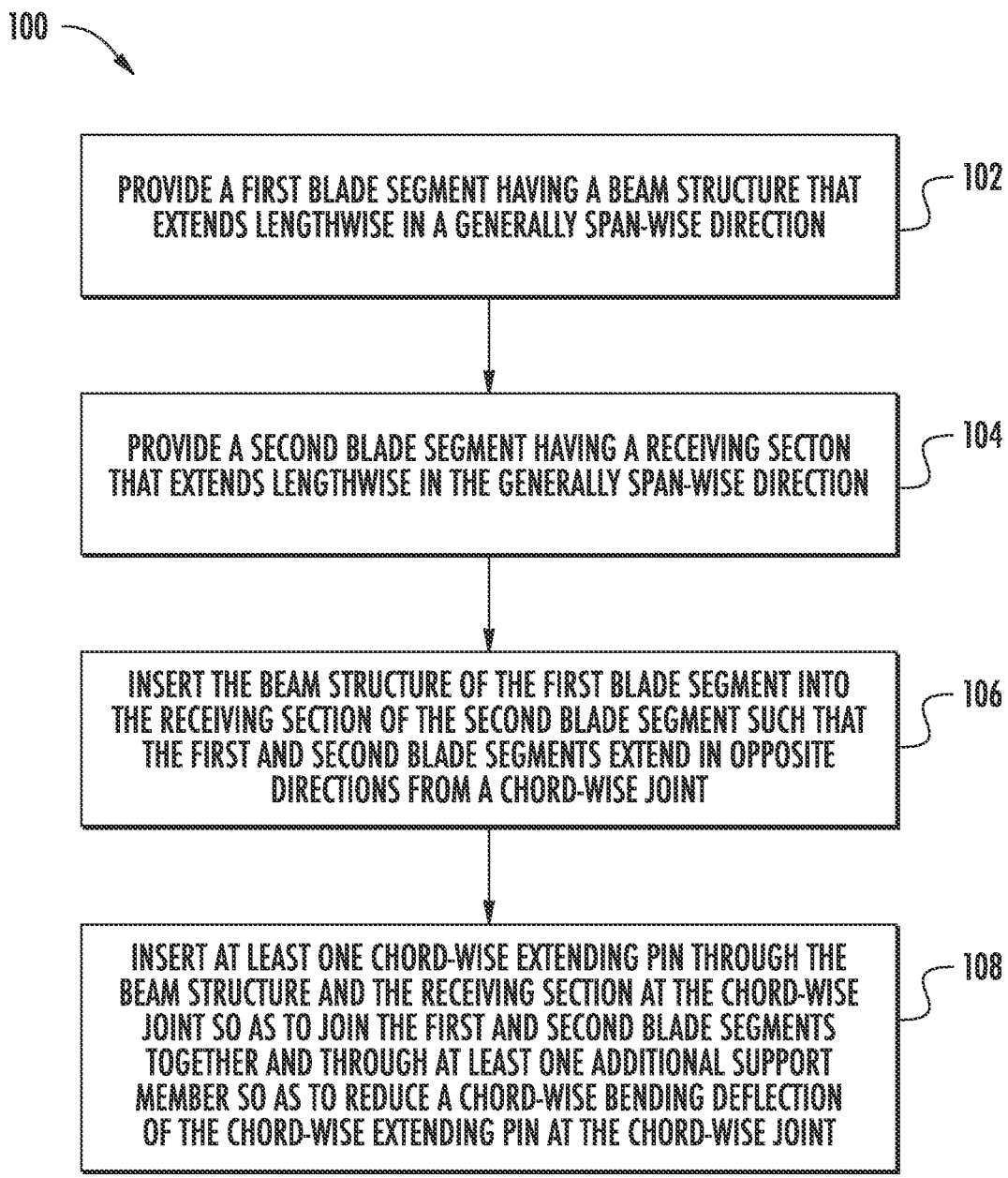
FIG. 13 illustrates a flow chart of one embodiment of a method of securing blade segments of a rotor blade of a wind turbine together according to the present disclosure.

Referring now to FIG. 11, in further embodiments, the additional support member 64 may also be at least one tube 95 positioned within the hollow beam structure 40. In such embodiments, as shown, the chord-wise extending pin 62 may extend through the tube(s) 95. In alternative embodiments, as shown in FIG. 12, the additional support member(s) 64 may be at least one filler material 98 that fills the hollow beam structure 40. In addition, as shown, the chord-wise extending pin 62 may extend through the filler material(s) 98. In such embodiments, the filler material(s) 98 may correspond to foam, wood (e.g. balsa wood), or similar.

Referring now to FIG. 12, a flow chart 100 of one embodiment of a method of securing blade segments of a rotor blade of a wind turbine together according to the present disclosure is illustrated. In general, the method 100 will be described herein with reference to the wind turbine 10 and the rotor blade 28 shown in FIGS. 1-12. However, it should be appreciated that the disclosed method 100 may be implemented with rotor blades having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include providing the first blade segment 30 having the beam structure 40 that extends lengthwise in a generally span-wise direction. As shown at (104), the method 100 may include providing the second blade segment 32 having the receiving section 60 that extends lengthwise in the generally span-wise direction. As shown at (106), the method 100 may include inserting the beam structure 40 of the first blade segment 30 into the receiving section 60 of the second blade segment 32 such that the first and second blade segments 30, 32 extend in opposite directions from the chord-wise joint 34. As shown at (108), the method 100 may include inserting at least one chord-wise extending pin 62 through the beam structure 40 and the receiving section 60 at the chord-wise joint 34 so as to join the first and second blade segments 30, 32 together and through at least one additional support member 64 so as to reduce a chord-wise bending deflection of the chord-wise extending pin at the chord-wise joint 34.

In one embodiment, the method 100 may include forming the beam structure 40 of the first blade segment 30 such that the additional support member(s) 64 is integral therewith. In another embodiment, as mentioned, the additional support member(s) 64 may include one or more web members 68, one or more tubes 95, and/or a filler material 98.

In further embodiments, the method 100 may include arranging the additional support member(s) 64 within the beam structure 40. Alternatively, the method 100 may include arranging the additional support member(s) 64 outside of the beam structure 40.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
 a first blade segment and a second blade segment extending in opposite directions from a chord-wise joint, each of the first and second blade segments comprising at least one shell member defining an airfoil surface and an internal support structure, the internal support structure of the first blade segment comprising a beam structure extending lengthwise, the internal support structure of the second blade segment comprising a receiving section, the receiving section receiving the beam structure of the first blade segment;
 a first chord-wise extending pin and a second chord-wise extending pin positioned through the beam structure and the receiving section at the chord-wise joint so as to secure the first and second blade segments together; and
 at least one additional support member receiving at least a portion of the chord-wise extending pin so as to reduce a chord-wise bending deflection of the chord-wise extending pin at the chord-wise joint,
 wherein ends of the first chord-wise extending pin and the second chord-wise extending pin abut against each other within the at least one additional support member.

2. The rotor blade of claim 1, wherein the at least one beam structure is hollow.

3. The rotor blade of claim 2, wherein the at least one additional support member comprises at least one web member, the first chord-wise extending pin or the second chord-wise extending pin extending through the at least one web member.

4. The rotor blade of claim 3, wherein the at least one web member is arranged within the hollow beam structure.

5. The rotor blade of claim 3, wherein the at least one web member is integral with the beam structure.

6. The rotor blade of claim 3, wherein ends of the first chord-wise extending pin and the second chord-wise extending pin abut against each other within the at least one web member.

7. The rotor blade of claim 3, wherein the at least one web member comprises a first web member and a second web member.

8. The rotor blade of claim 7, wherein the ends of the first chord-wise extending pin and the second chord-wise extending pin abut against each other between the first and second web members.

9. A method of securing blade segments of a rotor blade of a wind turbine together, the method comprising:
- providing a first blade segment having a beam structure that extends lengthwise in a generally span-wise direction;
- providing a second blade segment having a receiving section that extends lengthwise in the generally span-wise direction;
- inserting the beam structure of the first blade segment into the receiving section of the second blade segment such that the first and second blade segments extend in opposite directions from a chord-wise joint; and
- inserting a first chord-wise extending pin and a second chord-wise extending pin through the beam structure and the receiving section at the chord-wise joint so as to join the first and second blade segments together and through at least one additional support member so as to reduce a chord-wise bending deflection of the chord-wise extending pin at the chord-wise joint,
- wherein ends of the first chord-wise extending pin and the second chord-wise extending pin abut against each other within the at least additional support member.

10. The method of claim 9, further comprising forming the beam structure of the first blade segment such that the at least one additional support member is integral therewith.

11. The method of claim 9, wherein the at least one additional support member comprises one or more web members.

12. The method of claim 9, further comprising arranging the at least one additional support member within the beam structure.

* * * * *